US012130928B2

(12) United States Patent
Pandey et al.

(10) Patent No.: US 12,130,928 B2
(45) Date of Patent: Oct. 29, 2024

(54) METHOD AND SYSTEM FOR ANAMOLY DETECTION IN THE BANKING SYSTEM WITH GRAPH NEURAL NETWORKS (GNNS)

(71) Applicant: BINARYFLUX PTE. LTD., Singapore (SG)

(72) Inventors: Sankalp Pandey, Pune (IN); Chandrakant Sharma, Gwalior (IN); Aliaksei Bobryk, Malmö (SE)

(73) Assignee: BINARYFLUX PTE. LTD., Singapore (SG)

( * ) Notice: Subject to any disclaimer, the term of this patent is extended or adjusted under 35 U.S.C. 154(b) by 254 days.

(21) Appl. No.: 17/522,666

(22) Filed: Nov. 9, 2021

(65) Prior Publication Data

US 2022/0374524 A1 Nov. 24, 2022

Related U.S. Application Data

(60) Provisional application No. 63/187,310, filed on May 11, 2021.

(51) Int. Cl.
*G06F 21/57* (2013.01)
*G06F 21/55* (2013.01)
*G06N 3/04* (2023.01)

(52) U.S. Cl.
CPC .......... *G06F 21/577* (2013.01); *G06F 21/552* (2013.01); *G06F 21/554* (2013.01); *G06N 3/04* (2013.01)

(58) Field of Classification Search
CPC .... G06F 21/577; G06F 21/552; G06F 21/554; G06N 3/04; G06N 3/0464; G06N 3/08; H04L 63/1425; H04L 63/1441
See application file for complete search history.

(56) References Cited

U.S. PATENT DOCUMENTS

| | | | |
|---|---|---|---|
| 2007/0282855 A1* | 12/2007 | Chen | H04L 63/1425 |
| 2017/0310697 A1* | 10/2017 | Lefebvre | H04L 43/0888 |
| 2019/0138423 A1* | 5/2019 | Agerstam | G06F 11/3466 |
| 2021/0334822 A1* | 10/2021 | Pati | G06Q 40/08 |
| 2022/0038454 A1* | 2/2022 | Kuarsingh | H04W 12/71 |

FOREIGN PATENT DOCUMENTS

CN 110334130 A 10/2019

* cited by examiner

*Primary Examiner* — Sm A Rahman
(74) *Attorney, Agent, or Firm* — Maschoff Brennan

(57) ABSTRACT

A method and system for anomaly detection in the banking system with graph network of a plurality of interconnected gateways. The system continuously monitors a plurality of gateways, data flows related to and executed at a first gateway of the plurality of gateways, the gateway data flows including at least one or more of gateways in a network.

11 Claims, 3 Drawing Sheets

METHOD AND SYSTEM FOR ANAMOLY DETECTION IN THE BANKING SYSTEM WITH GRAPH NEURAL NETWORKS (GNNS)

FIELD OF INVENTION

The disclosure relates to the technical field of artificial intelligence for anomaly detection. More particularly, the present invention relates to Graph Neural Networks (GNNs) system configured to efficiently learn patterns of activity in the banking system and thereby provides superior identification of faults, cyber security threats and crimes in real time and retrospectively.

BACKGROUND ART

Neural networks are machine learning models that employ one or more layers of nonlinear units to predict an output for a received input. Some neural networks include one or more hidden layers in addition to an output layer. The graph neural network model is a machine learning model widely used in the field of machine learning. In many cases, multiple model training participants (e.g., e-commerce companies, courier companies, and banks) each possess different portions of the feature data used to train the neural network model. The multiple model training participants generally want to use each other's data together to train the neural network model of the graph, but do not want to provide their respective data to other individual model training participants to prevent their own data from being leaked.

In view of the above situation, a graph neural network model training method capable of protecting security of private data is proposed, which can cooperate with a plurality of model training participants to train a graph neural network model under the condition that the data security of the model training participants is ensured, so as to be used by the model training participants.

The GNN-based software is presently used in banking organisations (currently working or historical) to identify cyber security risks or any other unwanted activities with performance not possible with traditional methods. The cyber security risks which the GNN-based software can identify may include, but not limited to:
  Unauthorised access to secured data
  Insider threats
  Malicious software
  Corrupting/manipulating the data
  Social engineering Each such pattern of activity must be reported, and the system should be able to distinguish it from non-malicious false positive events significantly better than traditional methods.

Traditional methods make use of hand-coded deviations of activities $A_i$ from the usual values. The activities may be, but should not be limited to: accessing a certain account, filing a certain number of transfers, accessing the computer, etc. The deviations of activities $A_i$ from their usual values are calculated based on statistical formulae. These may take the forms similar in quality and spirit but not limited to the following example:

1. The mean/usual level of activity:

$$\langle A \rangle = \frac{\sum_{i=1}^{N} A_i}{N}$$

2. Standard deviation for the activity around the mean:

$$\sigma_A = \sqrt{\frac{\sum_{i=1}^{N}(A_i - \langle A \rangle)^2}{N}}$$

3. Error for the mean estimate:

$$\varepsilon_{\sigma_A} = \frac{\sigma_A}{\sqrt{N}}$$

4. 95 percent confidence interval: 95% Interval: $I_{0.95}=$ ($\langle A \rangle - 2\sigma_A$, $\langle A \rangle + 2\sigma_A$)
5. If the activity $A_i$ takes values outside of the 95 percent confidence interval $I_{0.95}$ is flagged as anomalous In the above example, the information in every activity $A_i$ for every gateway $N_j$ (for example employee, bank account, network address, etc.) is continuously monitored for deviations from the 95 percent confidence interval $I_{0.95}$. Complex anomaly scores are manually assigned to each gateway or activity, so as to identify unusual behaviour. As soon as an unusual activity outside of the confidence interval takes place, a warning is issued for examining the activity. Such scores usually indicate different levels of criticality depending on how much the activities $A_i$ differ from their usual values.

Traditional setups are based on statistical expectation and hand-coded patterns (relations between activities). For this reason, they have several important drawbacks, as we summarise in Table 1. While the traditional methods are excellent at identifying relatively simple anomalies in the system, they perform poorly at identifying new and/or complex patterns of activities. Detecting complex activities with traditional methods requires costly hand-coding of the patterns. Moreover, some cybersecurity threats may have patterns not readily identifiable by humans, making it impossible to hand-code them. Likewise, the hand-coded traditional methods are vulnerable to variations in complex cybersecurity threats, wherein variants of threats may circumvent the hand-coded rules for detecting them. Last but not least, hand-coding the alert systems for complex security threats are time-consuming and costly.

In the prior art, a Chinese application CN110334130A discloses a method for detecting abnormality of transaction data, medium, device and calculate equipment. The method comprises the steps of generating knowledge mapping based on the transaction data being obtained ahead of time. The node of knowledge mapping is used to indicate the account entity in transaction data, and the side between two nodes is used to indicate the transaction relationship between the corresponding account entities of two nodes. Figure deep learning is carried out to knowledge mapping using figure neural network, obtains the character representation of each edge in knowledge mapping, and by while character representation be determined as while corresponding transaction data feature vector; The feature vector input of predetermined transaction data to be detected is exported into the testing result of transaction data to be detected after the processing of neural network model using the neural network model that the feature vector training of transaction data obtains. As a GNN-based method, it improves over the traditional methods. As the same time, as the method is based entirely on the transaction data, its applicability is limited to transactions only and it cannot be applied for detecting or make use of other types of activity in a banking company.

The subject matter described herein is not limited to embodiments that solve any disadvantages or that operate only in environments such as those described above. Rather, this background is only provided to illustrate one example technology area where some embodiments described herein may be practiced.

SUMMARY OF INVENTION

This specification describes a graph neural network system for a banking organisation is implemented as computer programs on one or more computers/processors in one or more locations or via a server that implements a generative model of graphs which may be used to generate new graphs. Graph structures may be used to represent many different types of physical systems, entities, a transaction related activity and operating rules thereof.

The information flow in a banking organisation can be represented as a graph with gateways being agents (workers, customers, any other personal, device, nodes, operating system, e-mail client or other connected entity recording or processing information, server, processor, and/or I/O peripherals) joined by activities and relations. Banking security risks involve internal or external agents (gateways) and networks as well performing unwanted series of activities. GNNs are novel deep learning-based artificial intelligence (AI) algorithms which excel at learning and recognising patterns of activities in graphs. By using GNNs, we propose to effectively identify security risks and any other unwanted activities in banking systems, either retrospectively or in real time.

In one or more embodiments, the historical activity, transactional event data set may be a collection of data that has occurred. The data set may be composed of interaction event data occurring within a predetermined time period, for example, all interaction events occurring within a prescribed time. The subsequent and simultaneous events refer to events which occur in real time, each interactive event is recorded and stored, and training may be performed based on accumulated samples after the interactive events are accumulated for a period of time.

In one or more embodiments, a training data set is constructed using the historical event data set. When certain event data is judged to be credible within a prescribed time interval of the historical event data set, the tag of the said event data is a credible tag, and otherwise, the tag is a non-credible tag. Accordingly, the interaction relation subgraph constructed based on the event data is also marked with a corresponding label.

Therefore such as herein described there is provided a system for anomaly detection in the banking system with graph network of a plurality of interconnected gateways, the system comprising of a processor, and a memory storing one or more computer-executable machine learning instructions or data structures, and where the processor and the memory, are communicatively coupled with each other; and wherein upon execution of the one or more computer-executable machine learning instructions or data structures, by the processor, causes the system to continuously monitor a plurality of gateways, data flows related to and executed at a first gateway of the plurality of gateways, the gateway data flows including at least one or more of gateways in a network, either individually or in combination; one or more activities performed at or between any two or more gateways within the network, activities performed at or between any two or more gateway within the network or an activity performed between any gateway residing in the network and an external gateway outside the network, and where at least one activity in the one or more activities includes one or more sub-events; relational information between the gateways in the network; or a gateway state score, related to the first gateway, representing a threshold for an allowable activity pattern in the network; connect one or more sub-events, that are included in performing a first activity from among the one or more activities, where the operations of the first gateway enables recognizing of the patterns of activity in the network; record and classify the network activity pattern at the first gateway; assign a first gateway state score for the first activity pattern, where the first gateway state score represents an allowable behaviour pattern in the classified first type of pattern for the first gateway; learn and classify, in real time, a plurality of gateway patterns, related to one or more activities in the network, into a plurality of type of patterns, by monitoring and processing the gateway data information from one or more historical activities till ongoing one or more activities in real time; assign a gateway state score to each of the plurality of gateway patterns, where each of the gateway state score represents an allowable behaviour pattern in each of the plurality of type of patterns for the network of gateways; identify a new gateway pattern, for the network of gateways, by determining a deviation from the first gateway state score or the gateway state score for each of the plurality of gateway patterns or both; and generate an alert indicating the new gateway pattern as a potential anomaly behaviour for the first gateway; and wherein, by learning and classifying the gateway patterns for the gateways and assigning a gateway state score to the types of patterns for the gateways, the system is configurable to create a baseline of an allowable behaviour pattern for each gateway to indicate a normal operating state for the gateway and to learn allowable behaviour patterns and detect behaviour anomalies while minimising false positives (fraud).

BRIEF DESCRIPTION OF THE ACCOMPANYING DRAWINGS

DETAILED DESCRIPTION

Figure 1:
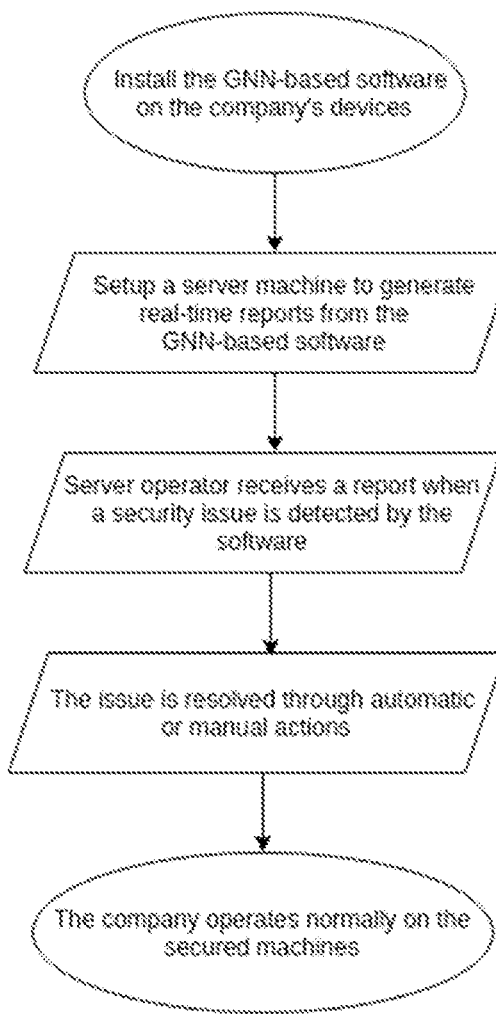
FIG. 1 illustrates a flowchart of Graph Neural Networks (GNNs) configured to efficiently learn patterns in accordance with the present invention.

The basic Graph Neural Network (GNN) system of the hardware implementation with real time workflow of systems and/or server is herein disclosed as an example.

The computer readable storage medium can be a tangible device that can retain and store instructions for use by an instruction execution device. In an exemplary embodiment, computer readable program instructions for carrying out operations of the present invention comprise assembler instructions, instruction-set-architecture (ISA) instructions, state-setting data, or either source code or object code written in any combination of one or more programming languages, including an object oriented programming language such as Java, Smalltalk, C++ or the like, and conventional procedural programming languages, such as the "C" programming language or similar programming languages. In another embodiment, the flowchart illustrations and/or block diagrams of methods, systems, and computer program products are herein disclosed. It will be understood that each block of the flowchart illustration and combinations of blocks in the flowchart illustrations can be implemented by computer readable program instructions.

The system may correspond to one or more computing devices connected wired or wirelessly, service provider system/server (one or more server(s)), user device, merchant/banking system (one or more devices of merchant system), issuer/client system (one or more devices of issuer/client system), and/or communication network (one or more devices of communication network). In some non-limiting embodiments or aspects, Graph Neural Network system, service provider system/server, user device, merchant/banking system, issuer/client system, and/or communication network may include at least one device and/or at least one component of device. As disclosed herein, system may include data flow/data bus, processor, memory, storage component, input component, output component, and/or communication interface.

The said data flow/data bus includes a component that permits communication among the components of device. In some non-limiting embodiments or aspects, processor may be implemented in hardware, software, or a combination of hardware and software. Memory may include random access memory, read-only memory, and/or another type of dynamic or static storage device that stores information and/or instructions for use by processor that can be programmed to perform a function.

As used herein, a gateway validates and includes identification information about a particular entity. An entity may be a person or an automated communicating gateway node (external and/or internal network), although the present invention is also applicable for providing an identity of a device, a software program, etc as a gateway. A gateway profile is composed of "attributes", "accessibility and limitations", which in one or more embodiments of the present invention, are represented as gateway in a graph of the profile. The different profiles and attributes are part of a graph, then set of characteristics shared by two or more gateways or subgraphs in the overall graph.

Figure 2:
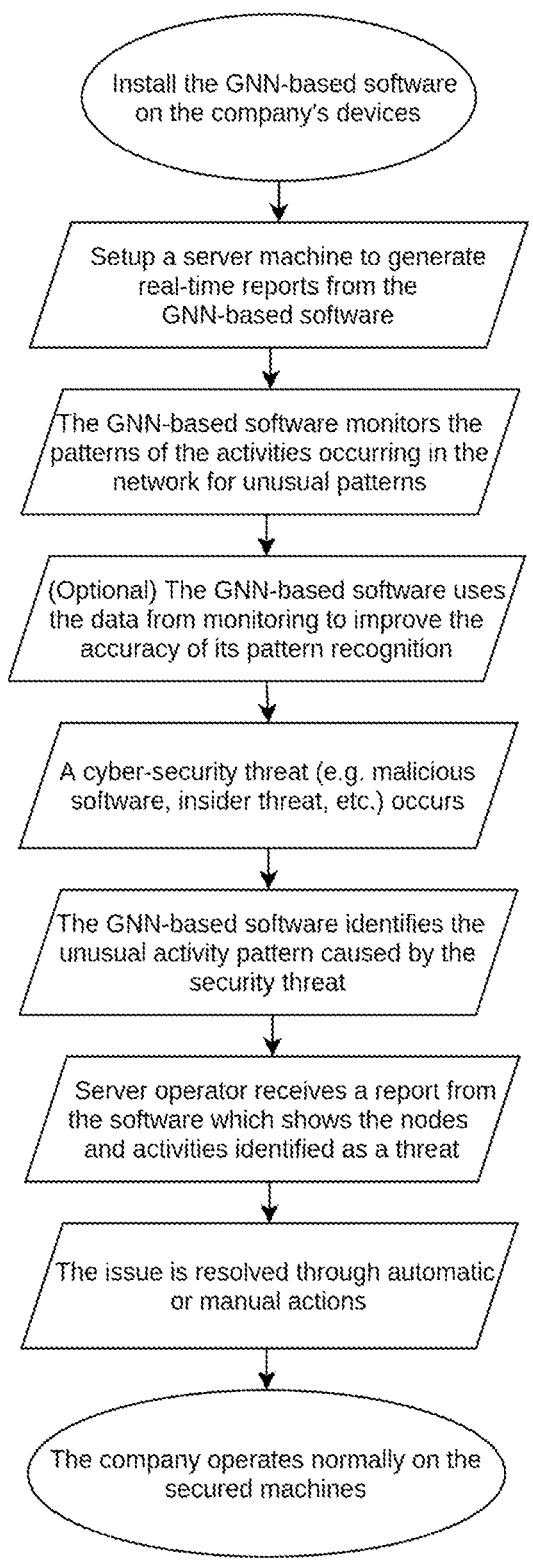
FIG. 2 illustrates a detailed flowchart for a possible application of the invention.
Figure 3:
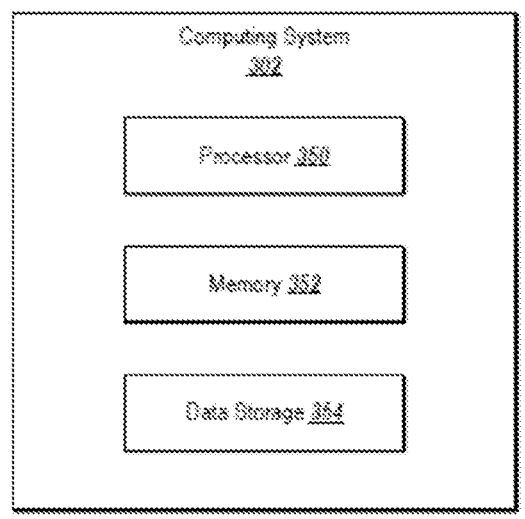
FIG. 3 illustrates an example computing system that can provide a suitable operating environment or platform for embodiments of GNNs and related methods described herein.

The flowchart and block diagrams in the FIGS. 1-3 illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s).

The enterprises such as banks and other financial institutions prefer to use "attributes" "accessibility and limitations", (of customers/users) that have a low similarity with fraudulent gateways, and a high similarity with identities that have been verified. That is, such entities prefer to use gateway that are unlike gateways known to be fraudulent, but rather are similar to, if not exactly the same as, known valid gateways. Therefore, the use of similar gateways provides two benefits to said enterprises in terms of security and analysis.

Security

The system is configured to continuously monitor a plurality of gateways, data flows related to and executed at a first gateway of the plurality of gateways, the gateway data flows including at least one or more of gateways in a network, either individually or in combination. The activity predictions can be used to determine how likely it is that a gateway is using and/or reusing attributes and profiles maliciously, i.e., if profiles for two different gateways look exactly alike then this is just as suspicious as two profiles for a same entity that are vastly different.

The monitoring further includes recordal and comparison to threshold/limitation to one or more activities performed at or between any two or more gateways within the network or an activity performed between any gateway residing in the network and an external gateway outside the network, and where at least one activity in the one or more activities includes one or more sub-events. The relational information between the gateways in the network in the network; or a gateway state score, related to the first gateway, representing a threshold for an allowable activity pattern in the network. The graph neural network (GNN) is configured to monitor the activities happening in the big network. The GNN is also configured to connect one or more sub-events, that are included in performing a first activity from among the one or more activities, where the operations of the first gateway are needed for recognising patterns of activity in the whole network.

The system is configured to record and classify the network activity pattern at the at least first gateway and thereby assign a first gateway state score to the for the first activity pattern, where the first gateway state score represents an allowable behaviour pattern in the classified first type of pattern for the first gateway. Thus, the present system enables the learning and classification, in real time, a plurality of gateway patterns, related to one or more activities in the network, into a plurality of type of patterns, by monitoring and processing the gateway data information from one or more threshold/limitation/historical activities till on-going one or more activities in real time.

The monitoring also includes assigning a gateway state score to each of the plurality of gateway patterns, where each of the gateway state score represents an allowable behaviour pattern in each of the plurality of type of patterns for the network of gateways and also identifying a new gateway pattern, for the network of gateways, by determining a deviation from the first gateway state score or the gateway state score for each of the plurality of gateway patterns or both. The system is configured to generate an alert indicating the new gateway pattern as a potential anomaly behaviour for the first gateway wherein by learning and classifying the gateway patterns for the gateways and assigning a gateway state score to the types of patterns for the gateways, the system is configurable to create a baseline of an allowable behaviour pattern for each gateway to indicate a normal operating state for the gateway and to learn allowable behaviour patterns and detect behaviour anomalies while minimising false positives.

Analysis

The plurality of the gateways is operably connected with the graph network, which is in particular a graph neural network (GNN). The said gateways connected in the graph network are at least one or more of client devices, or users of the client device or server devices and the client device is a computing device including a desktop, a workstation, a laptop, a smart phone, a tablet, or an I-Pad and the like. It may be appreciated by a person skilled in the art that the GNN includes a plurality of computer-executable machine learning instructions or data structures which are self-learning machine-based neural deep learning instructions. The said instructions/data structures upon execution of the one or more computer-executable machine learning instructions or data structures, by the processor, causes the system to generate a report including at least one or more of an indication that the deviation is safe and constitutes an allowable behaviour pattern for the network, the deviation is malignant and a threat, a remedial process to correct the deviation in case of the threat, or updates in a current remedial process to correct the deviation in case of the threat. The GNN is also configured to store the report and learn from the report by recording the new gateway pattern and updating the corresponding gateway pattern, type of pattern, gateway state score of the first gateway and communicate the alert, indicating the new gateway pattern about the deviation, to a server device. The step of analysis includes receiving of a report from the server device where the report including at least one or more of an indication that the deviation is safe and constitutes an allowable behaviour pattern for the network, the deviation is malignant and a threat, a remedial process to correct the deviation in case of the threat, or updates in a current remedial process to correct the deviation in case of the threat and store the report and learn from the report by recording the new gateway pattern and updating the corresponding gateway pattern, type of pattern, gateway state score of the first gateway.

In case of any noticeable anomaly, the processor, further causes the system to communicate the alert, indicating the new gateway pattern about the deviation, to a computing device related to a security personnel and further record time and duration of the gateway data information, the time includes a start time and an end time and the time duration includes a time interval.

The GNN is further configured to predict malicious/fraudulent gateways which are currently able to commit fraud using the same assets and patterns in different internal and external networks, as well as multiple gateways. Thus, the GNN includes analysis and similarity prediction algorithms are able to identify these behaviours and correlations in a way that is not possible, within a single centralized network, when determining overall confidence levels for all gateways.

The GNN is trained to detect and analyse the similarities between the pluralities of gateways that can be used to perpetuate and indicate fraudulent activity/hits. However, methods of reusing gateways are always evolving. Furthermore, multiple similar gateways can be reused for fraudulent purposes, and multiple similar attributes can be reused for fraudulent purposes. In addition, patterns in fraudulent identities can be identified in other similar questionable identities for investigation. The GNN is configured to generate an accurate gateway state score which requires looking at different properties/threshold/assignment/threshold etc of an attribute or member and the ways they behave over time.

To represent these properties, an algorithm reduces the dimensionality of a sparse, high-dimensional vector defining a gateway. Once this vector is of a manageable size, the graph models explore features of a gateway's local neighbourhood and represent this data in a new vector, which is called a frame. A frame represents important data about the vector and its neighbourhood. A frame is generated for each time step available in the identity networks. Using a learning sequence model, the system is able to determine a gateway score based on a gateway's behaviour and properties as they change over time.

Thus, in order to set up a graph all nodes are assigned a class based on the network from which they come. These gateways are aggregated/merged into correlated identity profile vertices, in order to create vectors for vertex property representation. The use of such a structured graph is then used to identify fraudulent behaviours indicated in labelled sequences of frames.

The behaviours in the plurality of gateways in an graph are identified using customized classifiers/dimensionality reducers for pre-processing if attributed; statistical or logical model for criteria; inductive representation learning for gateway embedding on attributed or non-attributed graph; a repetition of steps described above to create a sequence of embedding's; and/or a sequence model for classifying sequences of embedding's.

As described herein, one or more embodiments of the present invention uses artificial intelligence and machine learning to formulate an approach to combat fraud in decentralized gateway profiles. Such gateways are represented as attributed subgraphs-structures that link together different attributes, from often internal and/or external gateway/networks.

Thus, as described herein, one or more embodiments of the present invention use neural networks (graph neural networks, deep neural networks, etc.) to embed, or represent, the identity profile or attribute of interest and its interactions with other objects in the graph at a given time. One or more embodiments of the present invention also correlates/associates changes and interactions over time, or behaviours, of the gateway or attribute or "accessibility and limitations", to a gateway state score.

As such, the present invention has the capability to actionably use any data bus or data flow from any gateway within internal/external network can provide with different deep learning techniques and analytics, and is useful even only if minimal data like a graph structure is available, using behaviours and relationships between multiple gateways to perform analysis and fraud detection. The system yields several deliverables that a client can use in their fraud detection stack, depending on the data bus/data flow.

The present invention therefore provides an effective way for a system to compute a fraud score of an identity profile as it relates to others in a network or across multiple internal/external networks.

Referring now to FIG. 1, which is a basic flowchart of a non-limiting embodiment or aspect of a process for the implementation and use of Graph Neural Networks (GNNs) system configured to efficiently learn patterns. In some non-limiting embodiments or aspects, one or more of the steps and/or functions described with respect to process to identify security risks and any other unwanted activities in banking systems, either retrospectively or in real time. In some non-limiting embodiments or aspects, the process may include installing the GNN based software on the banking/user/client and similar devices. A server may be set-up in order to generate real time reports from the execution of the said GNN-based software. In case of a detection of any sort of security issue and/or identifying patterns of unwanted activities in banking settings an immediate remedial action and corrective measure is undertaken as per the banking procedure either manually or automatic.

As shown in FIG. 2, and in some embodiments, the GNN-based software entity may be a self-learning system capable of monitoring all the transaction/working states. In some embodiments, the said GNN-based software entity may verify and inspect transactions and entries, user credentials, privilege and policy, data request, data dissemination, generate reports, and answer queries based on understanding questions. In some embodiments, the said GNN may provide unique solutions to the user merchants and clients.

In some non-limiting embodiments or aspects, system is configured to record time of activity/operation and duration. The time duration may include a start time (e.g., a starting time of a day and/or a date) and an end time (e.g., an ending time of a day and/or a date). Additionally or alternatively, the time duration may include a time interval (e.g., an increment of time) at which a transaction related action may be performed during the time duration.

The herein disclosed system is configured for using Graph Neural Networks (GNNs) for automatically identifying patterns of unwanted activities in banking settings. GNNs is a deep learning-based AI approach which directly represents the set of gateways $N_j$ (employees, customers, bank accounts, . . . ) and activities $A_i$ (transactions, network access, login, . . . ) as a graph $\mathcal{G}$ (Zhou et al. 2019). Such representation is highly relevant to banking systems as graphs, by definition, are mathematical objects which represent relations ($A_i$) between gateways ($N_j$). Graph neural networks are a collection of machine learning and AI techniques designed to specifically identify complex patterns or relations $\mathcal{P}(A_i, N_j)$ on graphs. GNNs store an efficient internal representation $\mathcal{W}_{(ij),\ (kn),\ \ldots,\ (yz)}$ of the patterns occurring on the graphs. These representations $\mathcal{W}_{(ij),\ (kn),\ \ldots,\ (yz)}$ are learnt by the software by processing the ongoing or historical data. Mathematically, this is done by automatically minimizing the loss function $\mathcal{L}(\mathcal{W}_{(ij),\ (kl),\ \ldots,\ (yz)}, \mathcal{P}_{ij}, L_{ij})$ which encodes the difference between the patterns $\mathcal{P}(A_i, N_j)$ and the provided or automatically constructed labels $L_{ij}$ for the patterns $\mathcal{P}(A_i, N_j)$. The algorithm then finds the representation $\mathcal{W}_{(ij),\ (kn),\ \ldots,\ (yz)}$ which best allows the GNN system to identify patterns. The specific mathematical GNN formulations may be implemented through convolutional aggregators, gate updaters, attention aggregators, skip connections and achieved through supervised or unsupervised training techniques, or mathematical methods similar in quality and spirit to the proposed method.

GNNs offer several important advantages over traditional methods, as we summarise in Table 1. By feeding the history of activities $A_i$ in the whole network into the GNN, and, optionally, providing the labels for the types of activities, the GNN will automatically learn how to identify such activities with high accuracy. Moreover, GNNs excel at automatically identifying new patterns and classes of patterns of activities not encountered earlier, which is impossible to achieve with traditional methods. Furthermore, GNNs equally well perform at identifying complex patterns $\mathcal{P}(A_i, N_j)$, even if they are not intuitively visible for humans. This way, GNNs may provide protection against the complex threats which would be difficult to detect with traditional methods. GNNs can be pre-trained externally on large datasets before deploying them at a banking organisation, and/or be continually improved automatically over time internally.

Altogether GNNs promise to significantly increase both the accuracy and the ease of use of the alert system for the complex types of alerts.

Example First Case: Detecting Malicious Software in Banking Systems

GNNs may be applied, but should not be limited to, detecting malicious software in banking systems. The GNN is needed to monitor the activities happening in the big network.

Malicious software is programs/scripts introduced into a banking system by external parties in order to cause harm or take advantage of the system. Modern malicious software can be extremely sophisticated, operating over extended amounts of time and using designed techniques to avoid being detected by conventional methods. A GNN-based system will be continuously monitoring any activity performed within the banking system. At every point in time, it will be classifying all the activities occurring in the network by the patterns they belong to. GNNs are able to connect seemingly unrelated events into patterns. Therefore, they will report on a new pattern occurring in the banking system and will provide an estimate of the risk score for the pattern.

Traditional cybersecurity software may be blind to the activity of malicious software until the software inflicts critical damage to the system. In contrast, GNNs may detect the software from the early signs keeping the banking system safe.

Example Second Case: Insider Threat

Among the various embodiments of GNNs, they may be used to identify insider threats in a banking system. Insider threat is a situation when an employee or a person affiliated with the organisation willingly or unwillingly performs actions that cause harm, incur losses or in any other way adversely affect the banking organisation.

Traditional methods would be monitoring the statistics for different activities performed by each person and report a score indicating how much such activities deviate from the normal levels. If a person were to perform an action that could be classified as an insider threat, the system would issue a warning. Such actions may include, but should not be limited to, an employee giving away their login data to a spoofing website, an employee mistyping the command they plan to execute, an employee attempting to access protected data and others. The traditional methods, unfortunately, may perceive unusual but otherwise harmless activities, e.g. a person logging into the system from a colleague's computer, as insider threats, which results in costly and time-consuming checks. GNNs, on the other hand, will be able to identify patterns of activities specific to any given user and to identify types of activities from any user which may potentially be harmful or not harmful. For example, GNNs will be able to connect several actions undertaken by a user into a pattern and identify the type of the pattern. In the above example, if the employee's login data was lost to a spoofing website, and if someone else were to log in as an employee, the GNN will be able to infer that the pattern of behaviour for that person will differ from that of the employee. On the other hand, if a person were to log into the system from the colleague's computer, their pattern of behaviour will be recognised as the same, and no warning would be issued.

Altogether, GNNs are much more personalised and also much more accurate at classifying user behaviour compared to traditional methods.

Tables

TABLE 1

Comparison of the Traditional Methods and GNN-based Methods in banking software

| Task | Traditional Methods | GNN-based Methods |
| --- | --- | --- |
| Identifying simple anomalous activity | Excellent | Excellent |

TABLE 1-continued

Comparison of the Traditional Methods and
GNN-based Methods in banking software

| Task | Traditional Methods | GNN-based Methods |
|---|---|---|
| Identifying new types of cyber threats | Only if they resemble known threats | Excellent, automatic |
| Identifying complex activities | Costly, only if the activity is hand-coded | Excellent, automatic |
| Improving the detection over time | None | Possible |
| Transfer of detection efficiency between organisations | Poor | Good |

FIG. 3 illustrates a block diagram of an example computing system 302, that can provide a suitable operating environment or platform for implementing embodiments described herein, such as those relating to Graph Neural Networks systems adapted for efficiently learning patterns of activity in the banking system and thereby providing identification of faults, cyber security threats and crimes in real time and retrospectively.

The computing system 302 may be configured to implement or direct one or more operations associated with a crop system and/or a network. The computing system 302 may include a processor 350, a memory 352, and a data storage 354. The processor 350, the memory 352, and the data storage 354 may be communicatively coupled.

In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to, individually or collectively, perform or direct performance of any number of operations described in the present disclosure. Additionally, one or more of the processors may be present on one or more different electronic devices, such as different servers.

Computing system 302 may include or may have capabilities of communicating with artificial intelligence modules, systems or engines that provide the artificial intelligence resources and training functions described herein.

In some embodiments, the processor 350 may be configured to interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into memory 352, the processor 350 may execute the program instructions.

For example, in some embodiments, the modification module may be included in the data storage 354 as program instructions. The processor 350 may fetch the program instructions of a corresponding module from the data storage 354 and may load the program instructions of the corresponding module in the memory 352. After the program instructions of the corresponding module are loaded into memory 352, the processor 350 may execute the program instructions such that the computing system may implement the operations associated with the corresponding module as directed by the instructions.

The memory 352 and the data storage 354 may include computer-readable storage media for carrying or having computer-executable instructions or data structures stored thereon. Such computer-readable storage media may include any available media that may be accessed by a general-purpose or special-purpose computer, such as the processor 350. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 350 to perform a certain operation or group of operations.

Modifications, additions, or omissions may be made to the computing system 302 without departing from the scope of the present disclosure. For example, in some embodiments, the computing system 302 may include any number of other components that may not be explicitly illustrated or described.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, the scope of the invention is intended to be defined only by the claims that will be presented in any subsequent, related non-provisional patent applications.

We claim:

1. A system for anomaly detection in the banking system with graph network of a plurality of interconnected gateways, the system comprising:
   a processor, and
   a memory storing one or more computer-executable machine learning instructions or data structures, and
   where the processor and the memory, are communicatively coupled with each other;
   wherein upon execution of the one or more computer-executable machine learning instructions or data structures, by the processor, causes the system to:

continuously monitor a plurality of gateways, data flows related to and executed at a first gateway of the plurality of gateways, the gateway data flows including at least one or more of gateways in a network, either individually or in combination;

one or more activities performed at or between any two or more gateways within the network, activities performed at or between any two or more gateway within the network or an activity performed between any gateway residing in the network and an external gateway outside the network, and where at least one activity in the one or more activities includes one or more sub-events;

relational information between the gateways in the network;

determine a gateway state score, related to the first gateway, representing a threshold for an allowable activity pattern in the network;

connect one or more sub-events, that are included in performing a first activity from among the one or more activities, where the operations of the first gateway enables recognizing of the patterns of activity in the network;

record and classify the network activity pattern at the first gateway;

assign a first gateway state score for the first activity pattern, where the first gateway state score represents an allowable behaviour pattern in the classified first type of pattern for the first gateway;

learn and classify, in real time, a plurality of gateway patterns, related to one or more activities in the network, into a plurality of type of patterns, by monitoring and processing the gateway data information from one or more historical activities till ongoing one or more activities in real time;

assign a gateway state score to each of the plurality of gateway patterns, where each of the gateway state score represents an allowable behaviour pattern in each of the plurality of type of patterns for the network of gateways;

identify a new gateway pattern, for the network of gateways, by determining a deviation from the first gateway state score or the gateway state score for each of the plurality of gateway patterns or both;

generate an alert indicating the new gateway pattern as a potential anomaly behaviour for the first gateway; and wherein, by learning and classifying the gateway patterns for the gateways and assigning a gateway state score to the types of patterns for the gateways, the system is configurable to create a baseline of an allowable behaviour pattern for each gateway to indicate a normal operating state for the gateway and to learn allowable behaviour patterns and detect behaviour anomalies while minimizing false positives.

2. The system of claim 1, wherein the graph network is a graph neural network;

wherein the gateways connected in the graph network are at least one or more of client devices, or users of the client device or server devices and the client device is a computing device including a desktop, a workstation, a laptop, a smart phone, a tablet, or an I-Pad; and wherein the one or more computer-executable machine learning instructions or data structures are self-learning machine-based neural deep learning instructions.

3. The system of claim 2, wherein upon execution of the one or more computer-executable machine learning instructions or data structures, by the processor, further causes the system to generate a report including at least one or more of an indication that the deviation is safe and constitutes an allowable behaviour pattern for the network, the deviation is malignant and a threat, a remedial process to correct the deviation in case of the threat, or updates in a current remedial process to correct the deviation in case of the threat;

store the report and learn from the report by recording the new gateway pattern and updating the corresponding gateway pattern, type of pattern, gateway state score of the first gateway, communicate the alert, indicating the new gateway pattern about the deviation, to a server device;

receive a report from the server device, the report including at least one or more of an indication that the deviation is safe and constitutes an allowable behaviour pattern for the network, the deviation is malignant and a threat, a remedial process to correct the deviation in case of the threat, or updates in a current remedial process to correct the deviation in case of the threat; and store the report and learn from the report by recording the new gateway pattern and updating the corresponding gateway pattern, type of pattern, gateway state score of the first gateway.

4. The system of claim 3, wherein upon execution of the one or more computer-executable machine learning instructions or data structures, by the processor, further causes the system to communicate the alert, indicating the new gateway pattern about the deviation, to a computing device related to a security personnel.

5. The system of claim 1, wherein the system is further configured to record time and duration of the gateway data information, the time includes a start time and an end time and the time duration includes a time interval.

6. The system of claim 1, wherein the gateway data information includes user credentials and the one or more activities performed at the first gateway and also includes the system receiving user credentials from a user for accessing to use the system.

7. A computer program product comprising a computer readable storage medium having one or more computer-executable machine learning instructions or data structures, and wherein the one or more computer-executable machine learning instructions or data structures are self-learning graph neural network based deep learning instructions, and wherein the graph neural network includes a plurality of gateways interconnected to each other, and wherein the computer-executable graph neural network based deep learning instructions are executable by a processor to perform a method comprising:

continuously monitor a plurality of gateways, data flows related to and executed at a first gateway of the plurality of gateways, the gateway data flows including at least one or more of gateways in a network, either individually or in combination;

one or more activities performed at or between any two or more gateways within the network, activities performed at or between any two or more gateway within the network or an activity performed between any gateway residing in the network and an external gateway outside the network, and where at least one activity in the one or more activities includes one or more sub-events;

relational information between the gateways in the network;

or a gateway state score, related to the first gateway, representing a threshold for an allowable activity pattern in the network;

connect one or more sub-events, that are included in performing a first activity from among the one or more activities, where the operations of the first gateway enables recognizing of the patterns of activity in the network;

record and classify the network activity pattern at the first gateway;

assign a first gateway state score for the first activity pattern, where the first gateway state score represents an allowable behaviour pattern in the classified first type of pattern for the first gateway;

learn and classify, in real time, a plurality of gateway patterns, related to one or more activities in the network, into a plurality of type of patterns, by monitoring and processing the gateway data information from one or more historical activities till ongoing one or more activities in real time;

assign a gateway state score to each of the plurality of gateway patterns, where each of the gateway state score represents an allowable behaviour pattern in each of the plurality of type of patterns for the network of gateways;

identify a new gateway pattern, for the network of gateways, by determining a deviation from the first gateway state score or the gateway state score for each of the plurality of gateway patterns or both; and generate an alert indicating the new gateway pattern as a potential anomaly behaviour for the first gateway; and wherein, by learning and classifying the gateway patterns for the gateways and assigning a gateway state score to the types of patterns for the gateways, the system is configurable to create a baseline of an allowable behaviour pattern for each gateway to indicate a normal operating state for the gateway and to learn allowable behaviour patterns and detect behaviour anomalies while minimising false positives.

8. The computer program product of claim 7, wherein the graph network is a graph neural network, the gateways connected in the graph network are at least one or more of client devices, or users of the client device or server devices.

9. The computer program product of claim 7, wherein the computer-executable graph neural network based deep learning instructions are further executable by the processor to perform the method that further includes:

communicating the alert, indicating the new gateway pattern about the deviation, to a computing device;

receiving a report from the computing device, the report including at least one or more of an indication that the deviation is safe and constitutes an allowable behaviour pattern for the network, the deviation is malignant and a threat, a remedial process to correct the deviation in case of the threat, or updates in a current remedial process to correct the deviation in case of the threat; and storing the report and learning from the report by recording the new gateway pattern and updating the corresponding gateway pattern, type of pattern, gateway state score of the first gateway.

10. The computer program product of claim 7, wherein each of the gateway state score represents criticality, a score, a type, a weight, a confidence factor related to the allowable behaviour patterns of the first gateway.

11. The computer program product of claim 7, wherein the computer-executable graph neural network based deep learning instructions are further executable by the processor to perform the method that further includes recording time and duration of the gateway data information, the time includes a start time and an end time and the time duration includes a time interval.

* * * * *